United States Patent [19]
Jaquette

[11] 3,713,199
[45] Jan. 30, 1973

[54] O-RING MOUNTING MACHINE

[75] Inventor: Robert D. Jaquette, Charlotte, Mich.

[73] Assignee: Air-Way Manufacturing Co., Detroit, Mich.

[22] Filed: March 15, 1972

[21] Appl. No.: 234,956

Related U.S. Application Data

[62] Division of Ser. No. 37,955, May 18, 1970, Pat. No. 3,665,578.

[52] U.S. Cl. ................................. 29/211 R, 29/235
[51] Int. Cl. ........................... B23q 7/10, B23p 19/02
[58] Field of Search .29/211 C, 211 R, 211 D, 208 B, 29/208 E, 235

[56] References Cited

UNITED STATES PATENTS 3,448,507   6/1969   Jackson et al. ................... 29/211 C
3,518,744   7/1970   Boyd ................................. 29/208 B Primary Examiner—Thomas H. Eager
Attorney—Roy A. Plant

[57] ABSTRACT

An automatic loading device for loading annular members having a central opening over a vertically mounted cylindrical member of an O-ring mounting machine, the automatic loading device comprising a hopper, a means for orienting O-rings contained in the hopper and loading them over the vertically mounted cylindrical member.

1 Claim, 10 Drawing Figures

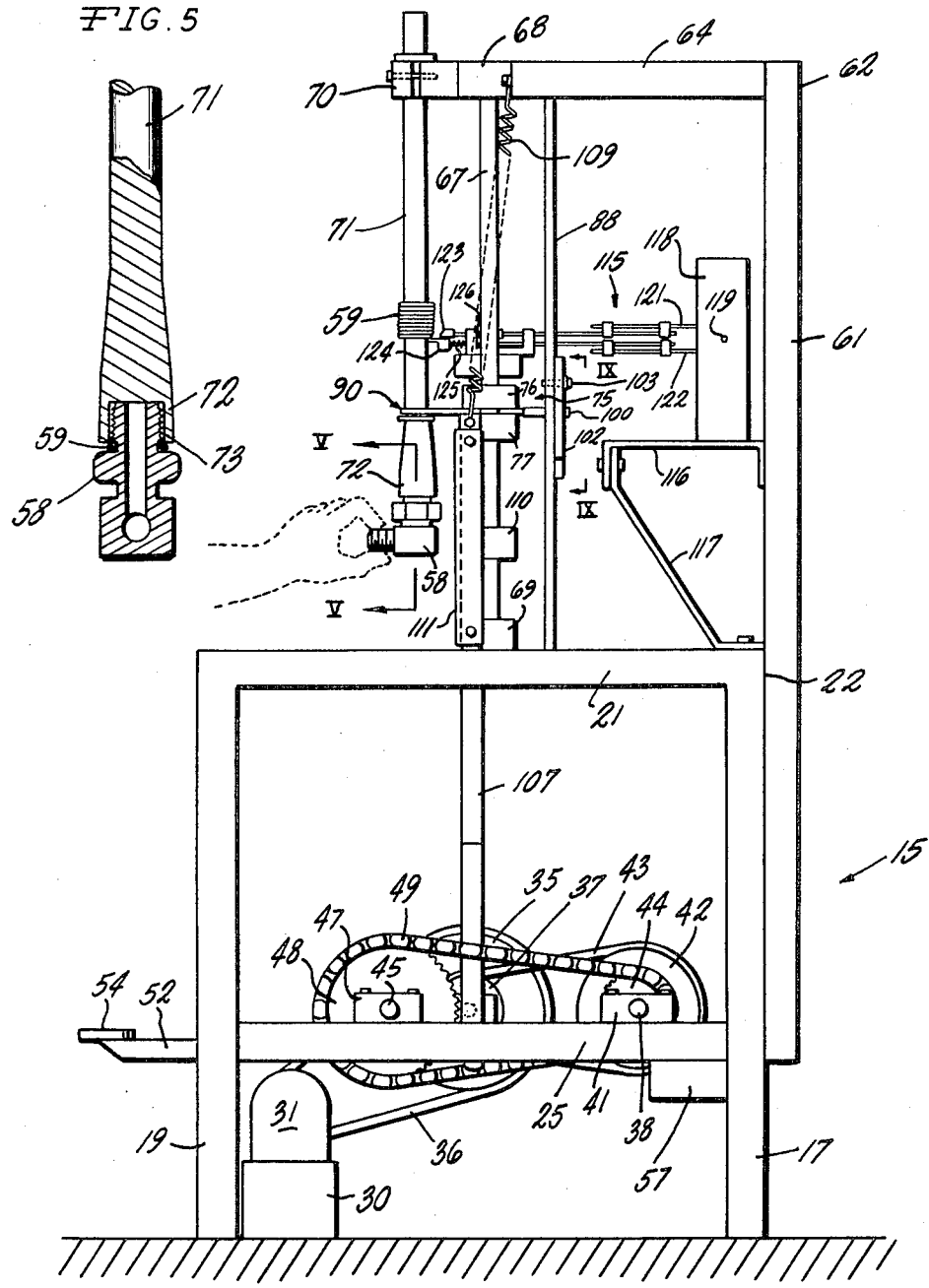

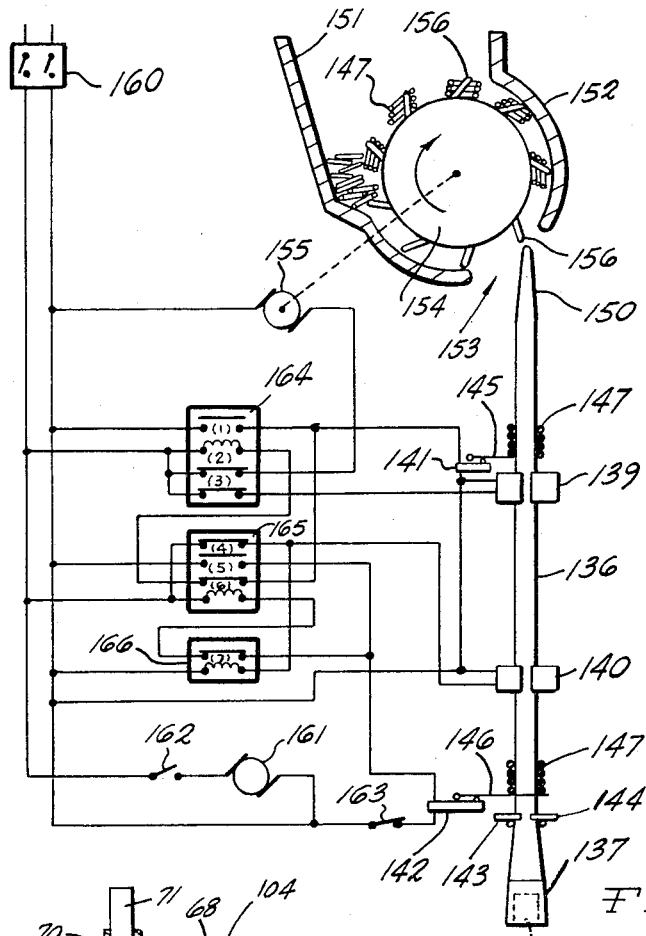
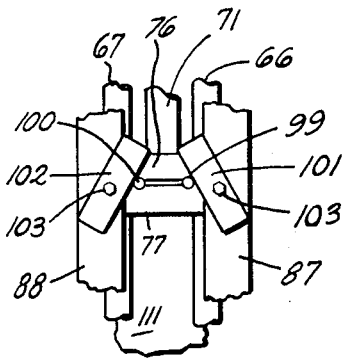
FIG.9
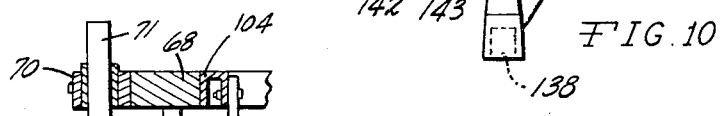
FIG.10
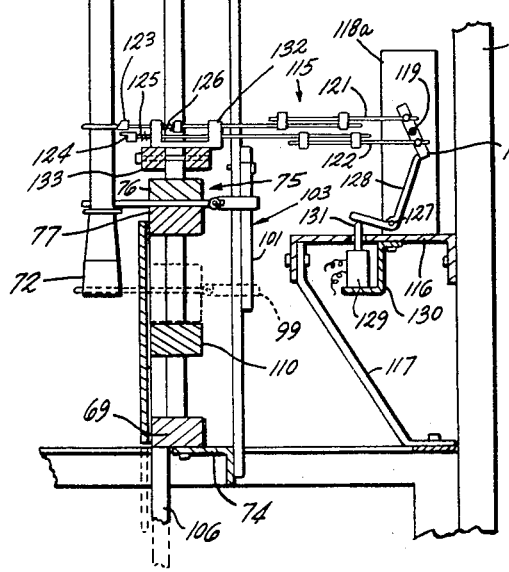
FIG.7
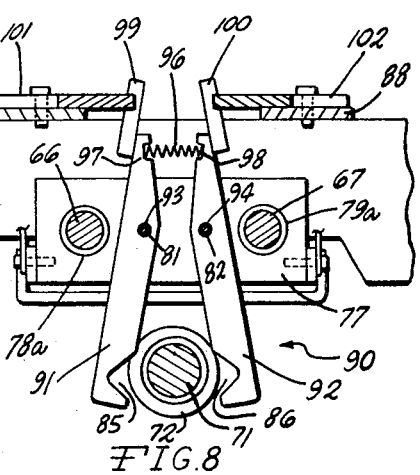
FIG.8

O-RING MOUNTING MACHINE

This is a division, of application Ser. No. 37,955, filed May 18, 1970 now issued May 30, 1972 as U.S. Pat. No. 3,665,578

BACKGROUND OF THE INVENTION

O-rings are widely used in trade and industry as a gasket between parallel surfaces of engaging members, as for example male and female pipe fittings. The mounting of O-rings on the male member of a part prior to use is commonly done by hand. This is a rather slow and time-consuming procedure since the O-ring must generally be stretched over the male member which at least in part has a diameter greater than that of the opening in the O-ring, and mounted in a seat or at the sealing surface.

SUMMARY OF THE INVENTION

It is accordingly an object of the invention to provide an apparatus for mounting O-rings on the male portion of a part.

It is a further object to provide such a machine which has a magazine for retaining a relatively large supply of O-rings so that they may be rapidly applied to a large number of parts.

It is a further object to provide an apparatus for mounting O-rings which is adaptable for use with a variety of sizes of O-rings.

It is still another object to provide an apparatus of the type described which with only slight change may be utilized with parts of various sizes.

It is an additional object to provide an apparatus which is relatively uncomplicated and inexpensive to produce.

It is still an additional object to provide an apparatus for mounting O-rings having automatic O-ring feed means so that the O-rings may be placed in a hopper and will automatically be supplied to the apparatus on demand.

Still further objects and advantages of the invention will appear as the description proceeds.

BRIEF DESCRIPTION OF THE DRAWINGS

To the accomplishment of the foregoing and related ends, the invention, then, consists of an O-ring mounting apparatus herein fully described and particularly pointed out in the claims, the annexed drawings and following description setting forth in detail certain illustrative embodiments of the invention, such disclosed embodiments illustrating, however, but several of the various ways in which the principle of the invention may be used.

In the annexed drawings:

FIG. 2 shows a side view of the O-ring mounting machine as seen from the right-hand side of FIG. 1.

FIG. 5 is a fragmentary sectional view as taken along line V—V of FIG. 2, looking in the direction of the arrows.

FIG. 7 is a fragmentary sectional view as taken along line VII—VII of FIG. 1, looking in the direction of the arrows.

FIG. 8 is a fragmentary sectional view as taken along line VIII—VIII of FIG. 1, looking in the direction of the arrows.

FIG. 9 is a fragmentary rear view as taken along the line IX—IX of FIG. 2, looking in the direction of the arrows; and FIG. 10 shows a modification permitting automatic feeding of O-rings onto a mandrel ready for feeding down same to mounting position.

DESCRIPTION OF THE SPECIFIC EMBODIMENT

Figure 3:
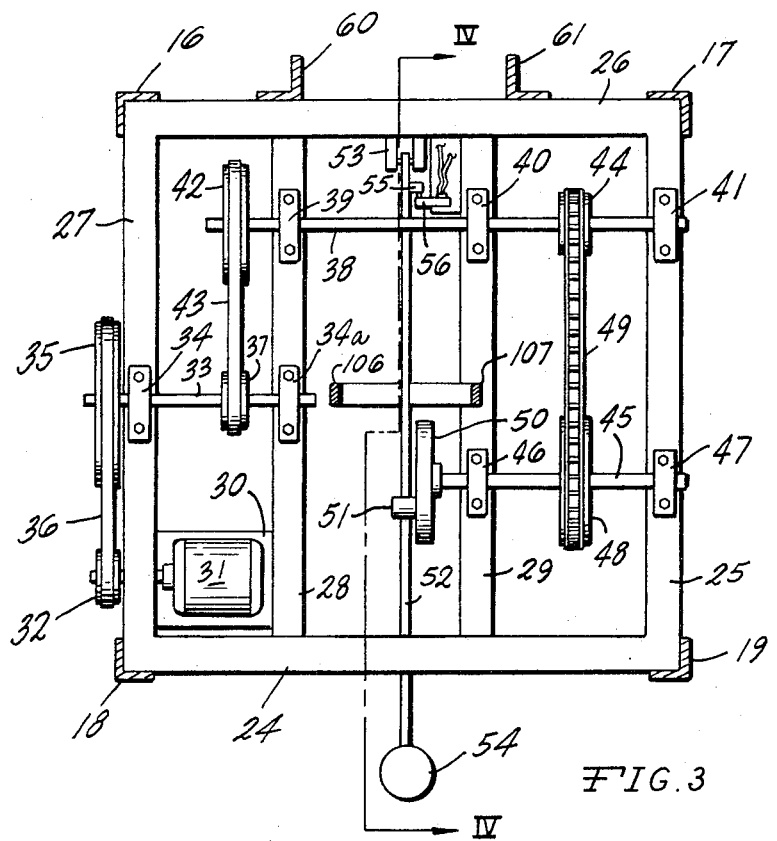
FIG. 3 is a sectional view as taken along line III—III of FIG. 1, looking in the direction of the arrows.
Figure 4:
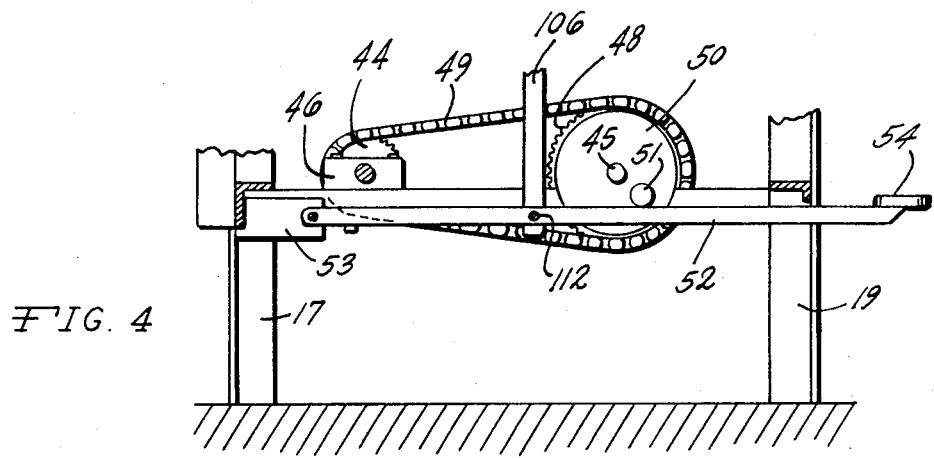
FIG. 4 is a sectional view as taken along line IV—IV of FIG. 3, looking in the direction of the arrows.

Referring more particularly to FIGS. 1, 2, 3 and 4, the apparatus for mounting O-rings is shown comprising a base frame 15 having four legs 16, 17, 18 and 19 preferably formed of structural angle metal, horizontal frame members 20, 21, 22 and 23, and a sub-platform 24, FIG. 3, formed with side and back angled members 25, 26 and 27. Horizontal shaft supporting members 25, 26 and 27. Horizontal shaft supporting members 28 and 29 are affixed to the members 24 and 26. As shown particularly in FIGS. 2 and 3, a motor base 30 having a motor 31 mounted thereon is provided, a pulley 32 being mounted on the motor shaft. A shaft 33 mounted in bearing blocks 34 and 34a is provided with a pulley 35 affixed at one end of the shaft 33 and is operatively connected to the pulley 32 by means of a belt 36. An additional pulley 37 is affixed to the shaft 33. Another shaft 38 is mounted in bearing blocks 39, 40 and 41, which blocks are affixed to the frame members 28, 29 and 25, respectively, the shaft 38 having a pulley 42 affixed at its end and operatively connected to the pulley 37 by means of a belt 43. The shaft 38 additionally has a sprocket 44 mounted thereon. A shaft 45 is mounted in bearing blocks 46 and 47, in turn mounted on frame members 29 and 25, respectively, and having a sprocket 48 affixed thereto operatively coupled to the sprocket 44 by means of a chain 49, as shown in FIG. 4. A drive disc 50 is affixed at the end of the shaft 45 and has an off-center drive pin 51 affixed at the outer face thereof. An operating lever 52 is pivotally mounted at its end by means of a trunnion mount 53, and is provided at its other end with a foot pedal 54. Near the pivotal end of the lever 52 is an actuating arm 55 adapted to engage a micro-switch 56.

Figure 1:
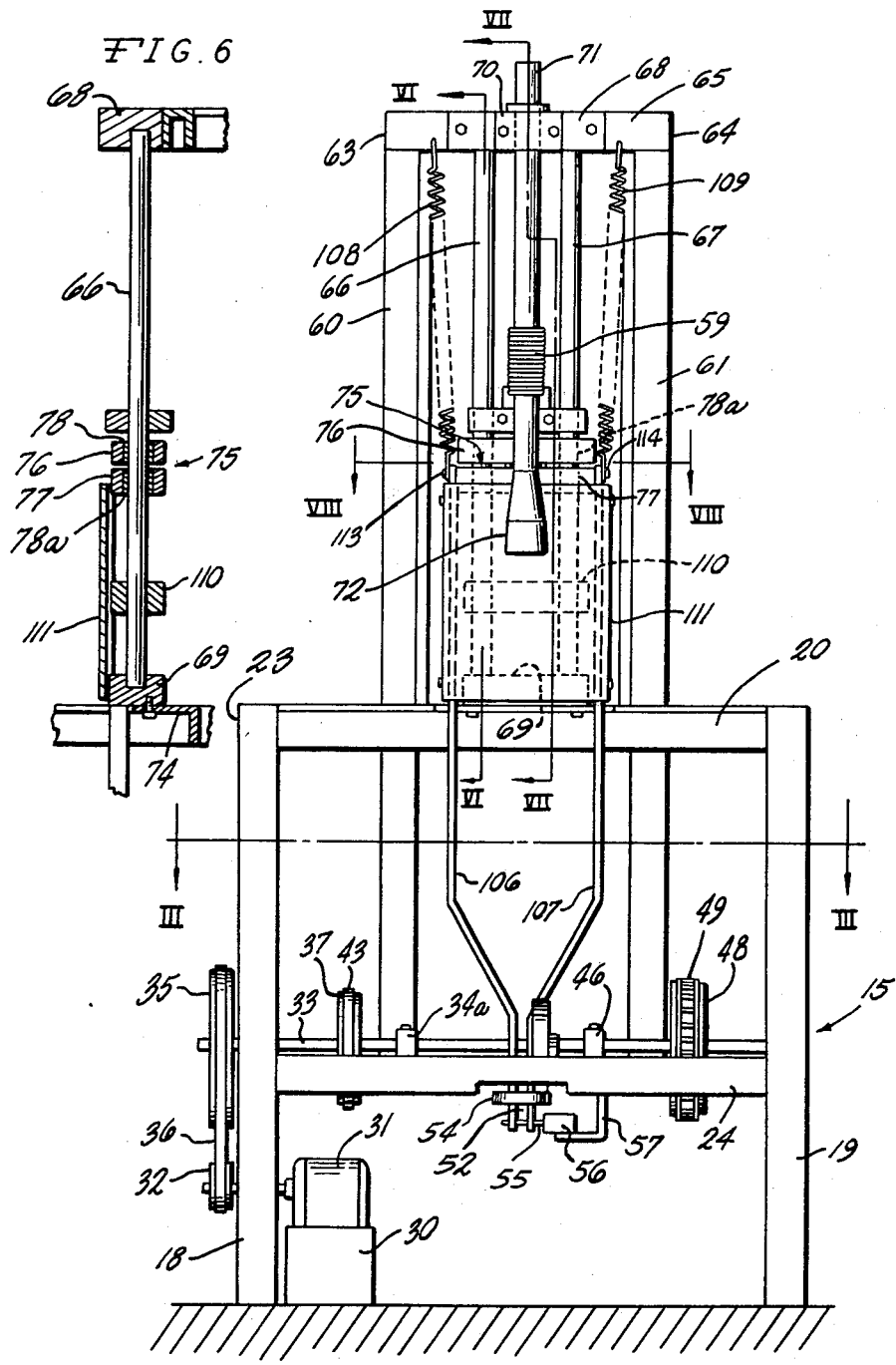
FIG. 1 shows a front elevational view of the O-ring mounting machine of the present invention.

As shown in FIGS. 1, 2 and 3, a vertical frame comprised of vertical supports 60 and 61 is affixed to the horizontal frame members 22 and 26. The supports 60 and 61 are connected at the top by means of a transverse frame member 62. Extending from the vertical supports are lateral supporting arms 63 and 64 connected together by a horizontal connecting arm 65.

Referring to FIGS. 1, 2 and 7, a pair of vertical travel guide rods 66 and 67 are shown mounted at their upper end by a rod support bracket 68 which in turn is mounted on the support 65, and at their lower ends by means of a rod support block 69 which in turn is mounted on an angle support 74, shown in FIG. 7.

A mandrel support bracket 70, FIGS. 1, 2 and 7, is mounted on the bracket 68 and supports a mandrel 71 having O-rings 59 thereon, which mandrel is generally of cylindrical form, but is provided with a flared lower end 72, FIG. 5, and an axial part-receiving chamber 73 within the flared end. The chamber 73 is designed to receive the end of a part 58 (FIGS. 2 and 5) upon which the O-ring is to be mounted. Mandrels having proper size chambers must be chosen for different sized parts, with the part receiving chamber 73 inserted in same as shown in FIG. 5.

Figure 6:
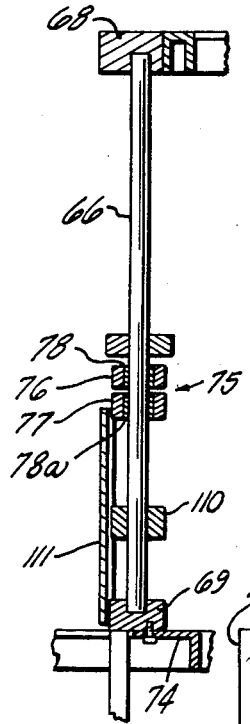
FIG. 6 is a fragmentary sectional view as taken along line VI—VI of FIG. 1, looking in the direction of the arrows.

The O-ring moving portion of the assembly comprises a head block 75, FIG. 6, having an upper member 76 and a lower member 77 slidably mounted over the travel rods 66 and 67, FIG. 1, through channels 78, 78a 79 and 79a and provided therein. The upper member 76 and lower member 77 of the head block 75 are affixed together by means of cap screws 81 and 82. The O-ring engaging mechanism comprises a finger assembly 90, shown in FIG. 8, including fingers 91 and 92 having holes 93 and 94 receiving the cap screws 81 and 82, respectively. Notches 85 and 86 are provided for engaging the mandrel 71. A compression spring 96 biases the jaws of the assembly toward the position of engagement with the mandrel 71, the ends of the springs being retained in recesses 97 and 98. Affixed to the ends of the fingers 91 and 92 are cam follower members 99 and 200. A cam support is provided by frame members 87 and 88 mounted at their ends at supports 74 and 104, FIGS. 7, 8 and 9. Mounted on the frame members 87 and 88 are cam plates 101 and 102. The cam plates 101 and 102 may be adjustably positioned so that the fingers 91 and 92 are maintained in open position and away from the mandrel surface when in the upper rest position. By rotating the cam plates 101 and 102 and tightening the bolts when in proper position, the apparatus may be adjusted so that the fingers 91 and 92 open at any position and to any degree, for example when mandrels of different sizes are used for mounting various sized O-rings.

As shown in FIGS. 1, 2, 3 and 4, transmission of movement from the operating lever 52 to the head block 75 is accomplished by means of a pair of connecting rods 106 and 107 which converge at their lower ends for pivotal connection by a pivot pin 112, shown in FIG. 4. The connecting rods 106 and 107 are connected at their upper ends to the lower member 77 of the head block 75 by bolts 113 and 114, FIG. 1. Extension springs 108 and 109 affixed at their lower ends by the bolts 113 and 114 to the lower member 77 of the head block 75 and at their upper ends through holes in the horizontal connecting arm 65, maintain the head block assembly normally in its uppermost position, maintained by a limit block 110, shown in FIGS. 1 and 6, limit block 110 being affixed to the travel rods 66 and 67 by clamping means. A cover plate 111 is affixed to the connecting rods 106 and 107 by means of screws (not shown).

As shown particularly in FIGS. 2 and 7, the O-ring single release assembly 115 comprises a horizontal table 116 supported by a support bracket 117. Mounted on the table 116 are a pair of parallel spaced vertical support plates 118 and 118a. A shaft 119 journaled in openings provided in the plates 118 and 118a has mounted thereon a lever 120 having adjustable rods 121 and 122 pivotally mounted thereon. The rods pass through openings in a U-support 132 mounted on the limit block 133. A beveled finger 123 is mounted on the end of the upper rod 121 and a straight supporting finger 124 is mounted at the end of the lower rod 122. The arrangement is such that the two fingers alternately extend and retract, the normal position being with the finger 124 in the extended position and the finger 123 in retracted position, as maintained by biased springs 125 and 126, FIG. 2, and shown in extended position in FIG. 7. A shaft 127 journaled through holes in the plates 118 and 118a supports a bell crank 128. The upper end of bell crank 128 engages the lower end of the lever 120 and the lower end of the bell crank engages the armature 131 of a solenoid 129 which is mounted on a support 130.

OPERATION OF THE O-RING MOUNTING APPARATUS

In order to place the apparatus shown in FIGS. 1–8 into operation, a mandrel 71 of suitable size is chosen and a supply of O-rings 59 placed over the mandrel. The upper end of the mandrel is then secured by the mandrel clamp 70 with the O-rings 59 positioned above the finger assembly 90, FIGS. 1, 2 and 8. If foot operation is desired, the pedal 54 of the operating lever 52 is depressed. This causes the connecting rods 106 and 107 to pull the head block 75 downward against the springs 108 and 109. As the cam followers 99 and 100, FIG. 8, leave the cam plates 101 and 102 the fingers 91 and 92 close tightly around the mandrel and engage the O-ring below, which was previously released. As the assembly continues to travel downwardly, the fingers force the O-ring axially over the flared end of the mandrel, the springs controlling the fingers permitting their expansion as the diameter of the mandrel increases. A part on which the O-ring is to be mounted is inserted with its end in the chamber 73, FIGS. 2 and 5. As the fingers reach the end of the mandrel, further travel is prevented by the adjustable position limit block 110. Additionally at this point the O-ring is forced off the end of the mandrel and is mounted in the retaining groove of the part 58. The operating lever 52 is then released, permitting the finger assembly 90 to return to its normal rest position with its jaws in the expanded state upon engagement of the surfaces of the cam plates 101 and 102. At this point a micro-switch, not shown, is closed and the single feed mechanism actuated to permit a single O-ring to fall down the mandrel to the flared portion and below the finer assembly. In this position the apparatus is in condition for another operation.

If it is desired to operate the apparatus electrically, a switch, not shown, is closed, causing the motor 31, FIGS. 2 and 8, to operate. Upon transmission of motion through the chain of pulleys, belts, sprockets and chains, shown in FIGS. 2, 3 and 4, the drive disc 50 is caused to rotate. As the disc rotates, the drive pin 51 engages the operating lever 52 and drives it through a complete cycle. When the drive disc 50 has made one revolution and returns to its starting position, a switch, not shown, is opened and the motor turned off.

The O-ring release assembly 115, FIG. 7, operates similarly to a phonograph record changer. In the normal rest position the finger 124 is extended to support the pile of O-rings 59 and the finger 123 is retracted. When the solenoid 129, FIG. 7, is actuated, the lever 120 is caused to rotate counter-clockwise, thereby extending the finger 123 so that it supports the entire pile except the lowermost O-ring, and retracts the finger 124 so that the lowermost O-ring is released. This permits the O-ring to fall past the finger assembly where it remains in position for the next operation. Upon release of the armature 131 of the solenoid 129 the fingers return to their rest positions with the finer 124 once more supporting the remainder of the pile while the finger 123 is retracted, FIG. 7.

FIG. 10 illustrates an improved embodiment of the invention having, in addition to the structure described above, automatic means for loading O-rings over the mandrel upon demand. In other respects the apparatus is the same as that described above. The embodiment shown in FIG. 10 comprises a mandrel 136 which is generally cylindrical, but, as in the case of the mandrel 71 of the previous embodiment, having its lower end 137 enlarged or flared, and provided with a chamber 138 for inserting the end of a part upon which an O-ring is to be mounted. However, in contrast to the previous embodiment, the upper end 150 of the mandrel is tapered to facilitate loading of the O-rings. The mandrel is supported by solenoid operated releasable supports or clamps 139 and 140. A micro-switch 141 (supply) is mounted above the support 139, while a second micro-switch 142 (demand) is mounted above a pair of fingers 143 and 144, similar to those designated as 91 and 92 in FIG. 8, the associated structure not being shown. The micro-switches 141 and 142 have actuating arms 145 and 146, respectively, positioned in the path of O-rings 147 which slide down the mandrel 136.

The O-ring supply structure comprises a hopper 151 mounted above the upper end 150 of the mandrel and having a partial cylindrical housing 152 with an opening 153 at the bottom thereof. A drum, cylinder, or disc 154 is rotatably mounted within the housing 152 and is operated by a motor 155. The drum 154 is provided with a plurality of spines or fingers 156 forwardly tilted in the direction of rotation of the drum 154. As the drum rotates, each spine is adapted to pick up several O-rings. The spacing between the wall of the cylindrical housing 152 and the ends of the spines is sufficiently small so that the O-rings cannot slip off the spines while they are positioned within the housing 152. As the spines with their load of O-rings reach the opening 153 and in registry with the end of the mandrel 150, the O-rings slip off the spines and onto the mandrel, where they stack up on the finger 145 of the micro-switch 141.

The components comprising the electrical operating circuit of the embodiment shown in FIG. 10, comprise a main switch 160 connected to an electrical line, an operating motor 161 arranged to operate the main portion of the apparatus, and equivalent to the motor 31 shown in FIGS. 1, 2 and 3. A switch 162 is provided for operating the motor. A switch 163 is connected in series with the micro-switch 142. In order to provide proper operation of the various components in the proper sequence, a multiplicity of relays are utilized, and shown in FIG. 10 comprising an upper support operating relay 164, a lower support operating relay 165, and a timer relay 166. The upper support operating relay 164 is provided with contacts (1), (2), and (3); the lower support operating relay 165 is provided with contacts (4), (5), and (6); and the timer relay 166 is provided with a contact (7). The contacts (1) and (5) are normally open, that is, in the position when the relay is not in actuated position. The contacts (2), (3), (4), and (6) are normally closed, that is, when the relays are not in actuated position. The relay 166 is operated normally in actuated condition, and in this condition the contact (7) is normally closed. The solenoid operated supports of clamps 139 and 140 are open in the non-actuated condition, that is, they do not support the mandrel. The contact (4) is provided with a 1-second delay when going from closed to open condition in order to give the support 139 an opportunity to close before the lower support 140 is opened by the opening of contact (4). Consequently at least one clamp is always in the actuated closed condition. The relay 166 is a timer relay and provides a 4-second delay when it is deactuated, thereby maintaining the lower support 140 open long enough to permit the O-ring supply to fall past the support 140. During operation the arrangement is such that at least one support is always actuated in order to support the mandrel, the actuated support being opened temporarily to permit O-rings to slide past the support. In order to place the apparatus in operation, the switch 163 is first placed in the off position. The main switch 160 is then closed, providing power to the relays and associated components. When the main switch 160 is first closed, relays 164 and 165 are unactuated and contacts (2) and (4) closed. The hopper motor is caused to operate and the solenoids of the upper supports 139 and lower supports 140 actuated to engage the mandrel 136 which must be properly positioned before the switch 160 is closed. As the hopper is operated, O-rings are loaded over the end 150 of the mandrel and come to rest on the actuating arm 145. When the O-rings have been loaded on the mandrel to the proper level, their weight causes the micro-switch 141 to close, thereby actuating the relay 164. As a result, contact (2) is broken, thereby stopping the hopper motor operation, removing current from the support 139 and causing it to open. At this point the switch 163 may be closed. The apparatus will now assume normal continuous operation. As the support 139 opens, it causes the arm 145 to be retracted, thereby permitting the entire load of O-rings to fall to the support 140. During this period, when the actuating arm 146 of the micro-switch 142 does not have sufficient O-rings bearing thereon, it closes the switch 142 which in turn energizes the lower support operating relay 165. As a result, the contact (4) is opened, thereby removing current from the lower support 140, the interlock contact (5) is closed, and the interlock contact (6) for relay 164 is opened, thereby disabling relay 164. The contact (4) is provided with a delay, as previously explained so that when the relay 165 is energized, the contact will not open until about 1 second after the energization of the relay, thereby insuring that the support 139 will be actuated into the closed condition before the support 140 is deactuated into the release position, in order to insure that at least one support will always engage the mandrel while the other opens to permit O-rings to slide down the mandrel 136. The opening of the contact (4) also de-energizes the timer relay 166. However, the contact (7) on the timer relay 166 is delayed so that it will not open until about four seconds after de-energization of relay, permitting the O-rings a 4-second period to drop down to the arm 146 before the support 140 is again closed by de-energizing the relay 165, and thereby once again closing contact (4) to provide actuation of the support 140. The micro-switch 142 and the support 140 are so cooperatively arranged, that as the support 140 opens it lifts the micro-switch, permitting the actuating arm 146 to rest on top of the O-rings which have been permitted to fall. Also, as the relay 164 becomes deactuated, the contact (2) is again closed causing the hopper motor to operate again until a sufficient load of O-rings on the mandrel causes the actuating arm 145 of microswitch 141 once again to close this micro-switch, thereby beginning a new cycle. The loading of O-rings, release of the supports to permit the O-rings to pass to the bottom of the mandrel, and reloading are all automatic, the various operations being initiated by the supply and demand micro-switches 141 and 142. However, in spite of the complexity of the automatic feed system, the operation of the O-ring applying apparatus itself is the same as described with respect to FIGS. 1–9.

The O-ring mounting apparatus of the present invention has been found to be extremely useful. Instead of going through the tedious process of manually expanding and forcing an O-ring over the male end of a fitting 58 until it reaches the mounting seat provided therefor, it is only necessary with the present apparatus to insert the end of the part into the properly chambered end of the mandrel of the apparatus, and either depress the operating lever by foot or press a button for electrical operation. With either type of operation an O-ring is quickly advanced over the flared end of the mandrel and onto the mounting seat of the part 58 with very little effort and with precision. The machine is not overly complicated or costly and only requires adjustment when changing from one size O-ring to another or from one size part to another. Moreover, the addition of the improved mandrel loading assembly obviates the need for loading individual mandrels 71 or 136 and removing the mandrels for reload when they are empty. With the automatic loading feature the apparatus can be used continuously indefinitely until the apparatus requires change for a different size.

In addition to the use of the machine for mounting O-rings, it can be adapted for a variety of other uses. For example, buggy or even automobile tires of appropriate type can be mounted by means of a mandrel which flares to at least the size of the wheel. In fact the principle can be used for mounting any elastic annular member which must be expanded before it can slip onto a hub or wheel periphery.

While but two forms of the invention have been shown and described, other forms within the spirit and scope of the invention will now be apparent to those skilled in the art. Therefore, the embodiments shown in the drawings are to be considered as merely setting forth the O-ring mounting apparatus invention for illustrative purposes, and are not intended to limit the scope of the invention herein described, shown and claimed. It is further to be noted that while directional terms have been used, same are not to be construed as a limitation of the invention since such use has been availed of to better describe the invention as used and illustrate in the drawings.

Other modes of applying the principle of my invention may be employed, instead of those explained, change being made as regards the apparatus herein disclosed, provided the means stated by the following claims or the equivalents of such stated means by employed.

I therefore particularly point out and distinctly claim as my invention:

1. An automatic loading device for loading annular members having a central opening over a vertically mounted cylindrical member, one end of which has a diameter no greater than that of the central opening of said annular members, comprising a hopper, a housing having its chamber connected with said hopper, rotary means rotatably mounted in said housing, said rotary means being provided with a plurality of spines obliquely mounted thereon, said spines leading forward in the direction of rotation of said rotary means, an opening at the lower portion of said housing immediately above the upper end of said cylindrical member, and motor means for causing said rotary means to rotate, the arrangement being such that as said rotary means rotates, said annular members are engaged by said spines and transported around said housing until they reach said opening in superposition over the end of said cylindrical member, at which position they are released from said housing and permitted to fall onto said cylindrical member.

* * * * *